United States Patent [19]

Tate, Jr. et al.

[11] 4,330,310

[45] May 18, 1982

[54] PLASTIC MULLION RAIL ASSEMBLY FOR REFRIGERATOR

[75] Inventors: Ralph Tate, Jr., Center Township, Vanderburgh County; John T. Woods, Scott Township, Vanderburgh County; Joseph G. Schapker, German Township, Vanderburgh County, all of Ind.

[73] Assignee: Whirlpool Corporation, Benton Harbor, Mich.

[21] Appl. No.: 180,491

[22] Filed: Aug. 22, 1980

[51] Int. Cl.³ .................. F25D 21/06; A47B 81/00
[52] U.S. Cl. ............................. 62/275; 312/214; 403/401
[58] Field of Search .............. 62/275, 248; 403/401; 312/214; 49/70

[56] References Cited

U.S. PATENT DOCUMENTS

| | | | |
|---|---|---|---|
| 1,537,678 | 5/1925 | Jensen | 403/401 |
| 3,152,672 | 10/1964 | Oppenhuizen et al. | 189/41 |
| 3,353,321 | 11/1967 | Heilweil et al. | 52/716 |
| 3,449,925 | 6/1969 | Barroero | 62/275 |
| 3,456,833 | 7/1969 | Cornelius | 220/9 |
| 3,465,536 | 9/1969 | Vogel et al. | 62/158 |
| 3,674,359 | 7/1972 | Crowe | 312/214 |
| 3,872,688 | 3/1975 | Tillman | 62/329 |
| 3,915,328 | 10/1975 | Hawes et al. | 312/214 |
| 4,080,764 | 3/1978 | Stowik et al. | 62/275 X |
| 4,150,518 | 4/1979 | Truesdell et al. | 312/214 X |

Primary Examiner—William E. Wayner
Attorney, Agent, or Firm—Wegner, McCord, Wood & Dalton

[57] ABSTRACT

A refrigeration apparatus having a cabinet including a divider mullion wall is provided with a mullion rail assembly mounted to the front outer edge of the mullion wall. The mullion rail assembly includes an insulating elongated member carrying a magnetically attractable strip for cooperation with the magnetic door gasket. The strip is spaced inwardly from the outer edges of the insulating elongated member so as to be thermally insulated from the refrigerated compartment of the apparatus. The strip may be secured at one end to the cabinet and the insulating elongated member may be secured at one end to another portion of the cabinet to permit relative displacement between the strip and elongated member for facilitated installation.

21 Claims, 5 Drawing Figures

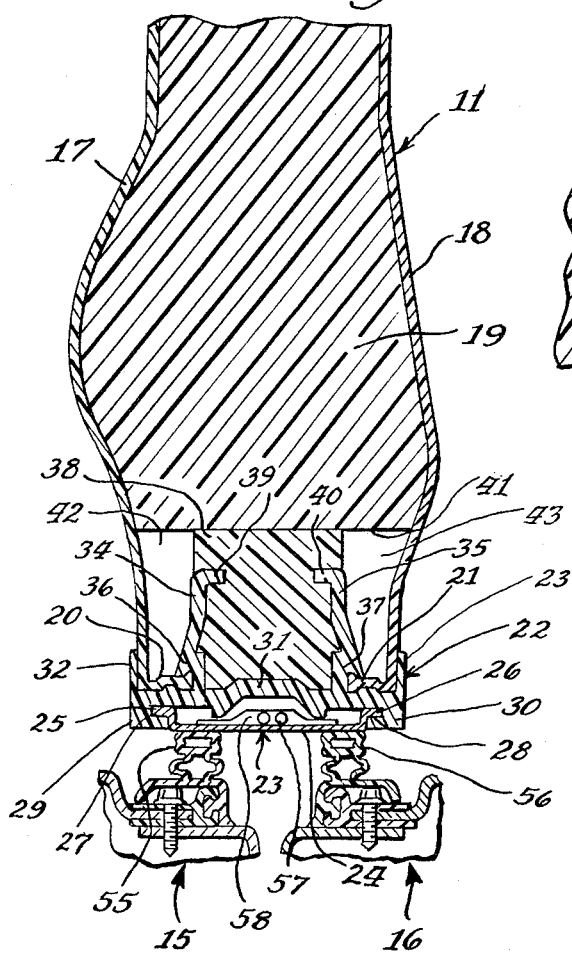
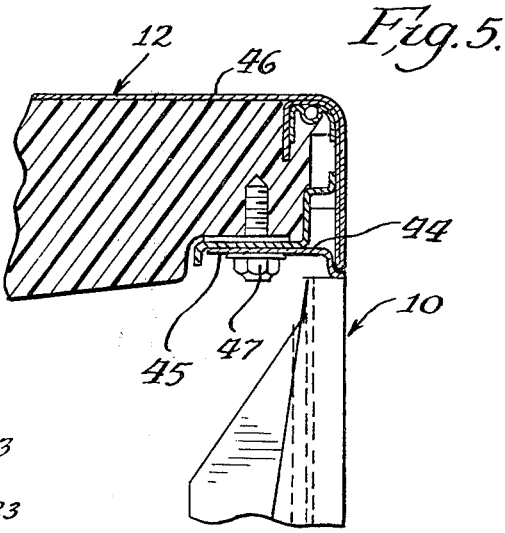
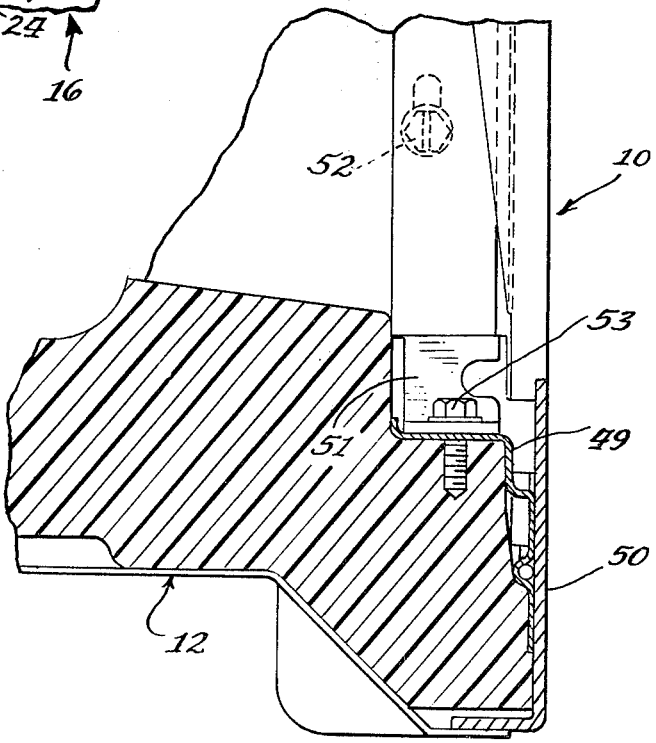

PLASTIC MULLION RAIL ASSEMBLY FOR REFRIGERATOR

BACKGROUND OF THE INVENTION

1. Field of the Invention

This invention relates to refrigeration apparatus and in particular to a mullion rail assembly in such apparatus.

2. Description of the Prior Art

In one form of refrigeration appliance, the outer cabinet is divided into compartments by a mullion wall. Illustratively, in U.S. Pat. No. 3,872,688 of Harry L. Tillman, which patent is owned by the assignee hereof, such a refrigeration appliance cabinet is divided into side-by-side compartments by a vertical divider mullion wall. The respective compartments are selectively closed by doors hingedly mounted to the cabinet and meeting in juxtaposed relationship in the closed disposition forwardly of the front edge portion of the mullion wall.

A substantial amount of heat transfer can take place through the mullion area of a side-by-side refrigerator. It has been found, for example, that half of the heat supplied to a conventional mullion rail by anti-condensation heaters actually flows into the refrigerated space. Such heat flow is undesirable because this heat must be removed by operation of the refrigeration apparatus, and the total energy efficiency of such apparatus is therefore reduced.

The present invention is concerned with an improved mullion rail structure adapted to be mounted to the front edge of the mullion wall to reduce heat transfer into the refrigerated space and to provide a condensation-free, magnetic closure means thereon.

A number of prior art devices have been developed for defining such mullion rail means. Illustratively, in U.S. Pat. No. 3,674,359, William P. Crowe shows a refrigerator cabinet having a removable partition mullion wall with a mullion rail carried on forwardly projecting supports.

Curtis A. Truesdell et al, in U.S. Pat. No. 4,150,518, disclose a means for attaching a U-shaped trim strip between the liners of the mullion wall. The structure includes a clip having one part frictionally attached to the mullion strip and a second part frictionally attached to the first part. The clip further serves to maintain spacing between the liners of the mullion wall.

Another thermal breaker strip is illustrated in U.S. Pat. No. 3,353,321 of Jerome P. Heilweil et al wherein a magnetically permeable metal strip is mounted on the breaker strip body portion by reception of converging ends of the metal strip in corresponding grooves of the body portion. The breaker strip is secured to the mullion wall by the foaming of the insulation in place with a securing portion of the breaker strip extending into the foamed-in-place insulation. The metal strip is adjacent one side edge of the breaker strip and provides a means for seating a magnetic door gasket against the breaker.

SUMMARY OF THE INVENTION

The present invention comprehends an improved mullion rail assembly for use in a refrigeration apparatus which is extremely simple and economical of construction.

The mullion rail assembly utilizes a magnetically attractable strip which is spaced from the refrigerated compartment by an edge portion of the mounting member so as to effectively preclude heat loss.

The improved mullion rail assembly provides improved efficiency in the use of mullion heaters in maintaining the magnetically attractable strip condensation free.

The improved mullion assembly provides for facilitated installation. More specifically, the assembly utilizes relatively adjustable elongated mounting member and strip elements.

The assembly is arranged to minimize stress on the cabinet and divider wall structures by providing for limited displacement between the elements thereof.

The improved mullion rail assembly is arranged to provide for facilitated installation on the mullion wall.

More specifically, the invention comprehends the provision of such an improved mullion rail assembly in a refrigeration apparatus having a cabinet defining an internal space and including opposite spaced walls, and mullion wall means extending between the spaced walls for dividing the space into compartments, the wall means defining an outer edge portion. The improved mullion rail assembly includes an elongated member formed of a thermal insulating material overlying the mullion edge portion to define an insulating outer mullion rail, means for securing one end of the elongated member to the refrigerator cabinet adjacent one of the spaced walls, an outwardly exposed elongated strip of magnetically attractable material on the mullion rail, the transverse extent of the strip being less than that of the insulating elongated member and the strip being spaced inwardly from the lateral side edges of the insulating elongated member whereby the strip is insulated from the compartments, and means for securing the elongated strip at one end thereof to the refrigerator cabinet adjacent the other of the spaced walls.

The invention further comprehends the provision of such a mullion rail assembly which includes an elongated member formed of a thermal insulating material overlying the mullion edge portion to define an insulating outer mullion rail, an outwardly exposed elongated thin strip of magnetically attractable metal, the transverse extent of the strip being a major portion of the transverse extent of the elongated member but less than that of the elongated member, and means for securing the side edges of the strip to the insulating elongated member with the strip being spaced inwardly from the lateral side edges of the insulating elongated member whereby the strip is insulated from the compartment.

Still further the invention comprehends provision of such an assembly including an elongated member formed of a thermal insulating material, means for securing the elongated member in overlying relationship to the mullion edge portion to define an insulating outer mullion rail, an outwardly exposed elongated strip of magnetically attractable material on the mullion rail, the transverse extent of the strip being less than that of the insulating elongated member and the strip being spaced inwardly from the lateral side edges of the insulating elongated member whereby the strip is insulated from the compartments, the strip further defining a turned end flange, and means for securing the strip end flange to the refrigerator cabinet adjacent one of the spaced walls.

Still further the invention comprehends the provision of such an assembly including an elongated member formed of a thermal insulating material, means for fitting the elongated member to the mullion wall means outer edge portion to define an insulating outer mullion rail, an outwardly exposed elongated strip of magnetically attractable material carried on the mullion rail outer edge portion, the transverse extent of the strip being less than that of the insulating elongated member and the strip being spaced inwardly from the lateral side edges of the insulating elongated member, and heating means disposed between the elongated member and the strip for heating the strip to prevent condensation collection thereon, the spacing of the heated strip from the side edges of the insulating elongated member effectively preventing heat transfer from the strip to the compartments.

Thus, the improved mullion rail assembly of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein:

FIG. 3 is a fragmentary enlarged horizontal section taken substantially along the line 3—3 of FIG. 1;

FIG. 4 is a fragmentary enlarged vertical section taken substantially along the line 4—4 of FIG. 1; and FIG. 5 is a fragmentary enlarged vertical section taken substantially along the line 5—5 of FIG. 1.

DESCRIPTION OF THE PREFERRED EMBODIMENT

Figure 1:
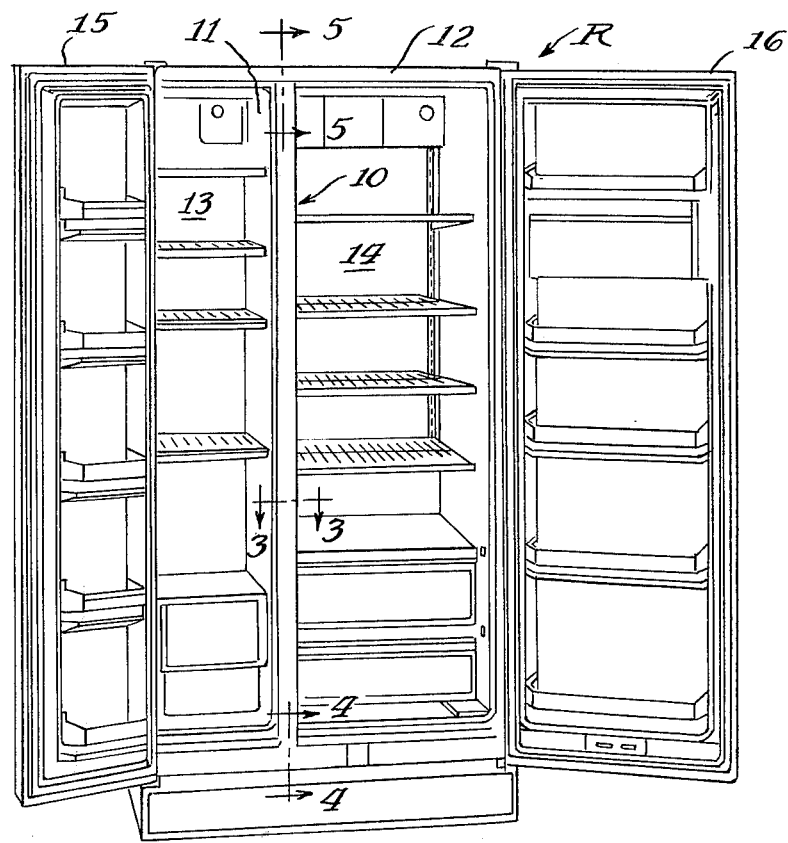
FIG. 1 is a perspective view of a refrigeration apparatus having an improved mullion rail assembly embodying the invention.

In the illustrative embodiment of the invention as disclosed in the drawing, an improved mullion rail assembly 10 embodying the invention is shown for use with a dividing mullion wall means 11 illustratively provided as the vertical dividing wall within the outer cabinet 12 of a refrigeration apparatus generally designated R. As illustrated, the dividing mullion wall 11 divides the interior of cabinet 12 into two side-by-side compartments 13 and 14, respectively, which may be selectively closed by doors 15 and 16, respectively, hingedly mounted to the cabinet so as to swing inwardly to bring their distal ends into juxtaposition adjacent the mullion rail assembly in the closed position.

As best seen in FIG. 3, the dividing wall means 11 is defined by a pair of spaced liner panels 17 and 18 and a body of insulation 19 therebetween. The front, or outer, end of the liner 17 is turned inwardly to define a flange 20 and the corresponding front edge of the liner 18 is turned inwardly to define a flange 21. The divider liners 17 and 18 may be formed of a suitable synthetic resin, such as ABS.

Mullion rail assembly 10 includes an elongated member 22 formed of a suitable thermal insulating synthetic resin, such as ABS, and a strip 23 of magnetically attractable material, such as ferrous metal. By way of example, strip 23 may comprise a strip of cold rolled steel having a thickness of 0.030 inches. As best seen in FIG. 3, the magnetic strip 23 includes a planar midportion 24 and rearwardly spaced edge portions 25 and 26. The edge portions 25 and 26 are slidably received in channels 27 and 28 provided in the edge portions 29 and 30 of the elongated member 22 so as to dispose midportion 24 in forwardly spaced relationship to a transverse wall portion 31 of elongated member 22.

Elongated member 22 further defines an outer pair of rearwardly extending wall portions 32 and 33 and a pair of inwardly spaced rearwardly extending wall portions 34 and 35. The inner wall portions 34 and 35 are provided respectively with the shoulders 36 and 37 adapted to be snap-fitted against the inturned flanges 20 and 21 of the liner panels 17 and 18 when the member 22 is urged rearwardly to receive the flanges 20 and 21 in the space between the rearwardly extending walls 32, 34 and 33, 35 of the elongated member.

Edge portions 25 and 26 of the strip 23 are slidably received in the channels 27 and 28 so as to permit displacement of the strip relative to the elongated member to provide stress-free accommodation of the mullion rail assembly relative to thermal contraction and expansion of the cabinet 12.

As further shown in FIG. 3, a block 38 of suitable insulating material, such as fiberglass or the like, is mounted to the rearwardly extending walls 34, 35 by inturned rear flanges 39 and 40 thereof. The block extends forwardly from the front face edge 41 of insulation 19 fully between the walls 34 and 35 to the transverse wall 31, as shown in FIG. 3. As further illustrated, dead air spaces 42 and 43 are disposed outwardly of the insulating block 38 inwardly of the liners 17 and 18, respectively.

Figure 2:
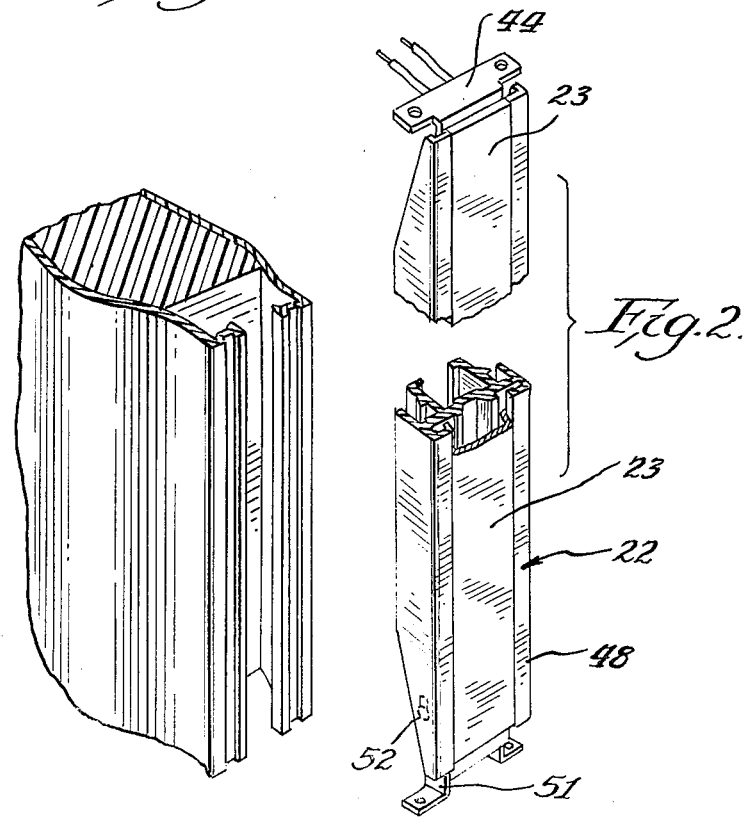
FIG. 2 is a fragmentary exploded perspective view of the mullion rail assembly and a portion of the mullion wall means of which the assembly is mounted.

The invention further comprehends a novel method of mounting the mullion rail assembly 10 to the cabinet 12. Thus, as illustrated in FIGS. 2 and 5, strip 23 is provided at its upper end with a turned flange 44. Flange 44 extends horizontally rearwardly to underlie a mounting bracket 45 carried by the top wall 46 of cabinet 12. Flange 44 is secured to bracket 45 by suitable screws 47.

Referring now to FIGS. 2 and 4, the lower end 48 of the insulating member 22 is secured to a mounting bracket 49, carried on the front cabinet rail 50 of cabinet 12, by a connector 51. The mullion rail assembly is secured to the connector 51 by suitable screws 52 and to the bracket 49 by suitable screws 53. Brackets 45 and 49 may be secured to the refrigerator cabinet by suitable means, such as welding.

Conventional breaker strips, omitted from FIGS. 4 and 5 for clarity, may be used to cover the insulation and areas at which the elements of the mullion assembly connect with the cabinet.

As further illustrated in FIG. 3, door 15 is provided with a magnetic closure seal 55 and door 16 is provided with a similar magnetic closure seal 56. As illustrated, the closure seals are positioned on doors 15 and 16 so as to overlap the insulating member edge portions 29 and 30 outwardly of the side edges of the strip midportion 24, thereby effectively reducing heat transfer from the strip to the refrigerated space within compartments 13 and 14. As shown in FIG. 3, a suitable electric heater 57 may be provided in the space 58 rearwardly of the strip midportion 24 for heating the strip 23 between the closure seals 55 and 56 to prevent condensation collection thereon. However, as the heated strip 23 is effectively insulated from the compartments 13 and 14, as discussed above, improved efficiency in the use of the heating energy is obtained as a result of the prevention of heat loss from the strip to the refrigerated compartments.

As further illustrated in FIG. 3, transverse wall portion 31 of member 22 effectively supports midportion 24 of the strip 23, permitting the strip to be formed of relatively thin metal. Because strip 23 is thin and has a relatively small mass, the amount of heat required from the anti-condensation heater 57 is reduced, thus improving the energy efficiency of the associated refrigeration apparatus R.

As the elongated member 22 and the strip member 23 are longitudinally slidably displaceable, movement between the top wall 46 and front cabinet rail 50 of the cabinet is readily accommodated by the improved mullion rail assembly without imparting harmful stresses to the wall structures.

As indicated above, the elongated member 22 is readily installed on the front edge of the mullion divider wall 11 by the simple snap-fitted engagement of the flanges 20 and 21 relative to the shoulders 36 and 37.

The invention comprehends that the transverse extent of the magnetic strip be less than that of the insulating support member 22 so as to permit the edge portions 25 and 26 of the strip to be spaced inwardly from the lateral side edges of the insulating member. This arrangement prevents the strip edge portions 25 and 26 from being in contact with the air within the refrigerated compartments 13 and 14. The reception of the strip edge portions 25 and 26 in the channels 27 and 28 of the insulating member provides improved slidable means for securing the strip to the insulating member along the entire length thereof. In the illustrated embodiment, the midportion 24 of the strip 23 extends a major portion of the transverse extent of the insulating member but less than that of the insulating member in centered relationship thereto. The edge portions 25 and 26 extend parallel to the midportion 24 to effectively lock the strip against forward displacement from the insulating member, while yet providing facilitated slidable displacement therebetween, as discussed above. As shown in FIG. 3, the strip midportion 24 is substantially flush with the front surfaces of the insulating member edge portions 29 and 30 to provide a planar surface of abutment by the magnetic seals 55 and 56 on the doors 15 and 26, respectively. The coplanar arrangement of the grooves 27 and 28 assures that the strip is maintained in such flush disposition, notwithstanding relative longitudinal displacement between the strip and the insulating member, as discussed above.

The provision of the turned end flange for securing the strip to the top wall bracket 45 provides a facilitated low cost means for connecting the strip to the cabinet. As will be obvious to those skilled in the art, the improved mullion rail assembly is adapted for use with divider walls extending in any direction, the illustrative arrangement of the vertical divider wall being exemplary of the invention.

By centering the heating means 57 relative to the centered midportion 24 of the strip 23, improved effective insulation of the heating means and heated strip from the refrigerated compartments may be effected by the insulating edge portions 29 and 30 of the insulating member 22, as discussed above. The provision of the snap fit mounting means on the mullion wall liners 17 and 18 further assures an accurate centered arrangement of the mullion rail assembly 10 thereon.

The insulative block 38 provides further improved support of the midportion of the transverse wall 31 of insulating member and, thus, of the midportion of the thin metal strip 24, as illustrated in FIG. 3.

Thus, the improved mullion rail assembly not only provides for facilitated installation, but further provides for stress-free mounting thereof in the refrigeration apparatus cabinet and for improved energy usage efficiency.

The foregoing disclosure of specific embodiments is illustrative of the broad invention concepts comprehended by the invention.

Having described the invention, the embodiments of the invention in which an exclusive property or privilege is claimed are defined as follows:

1. In a refrigeration apparatus having a cabinet defining an internal space and including opposite spaced walls and mullion wall means extending between said spaced walls for dividing said space into compartments, said mullion wall means defining an outer edge portion, an improved mullion rail assembly comprising:
   means on said outer edge portion of the mullion wall means defining first securing means;
   an elongated member formed of a thermal insulating material overlying said edge portion to define an insulating outer mullion rail and having second securing means releasably fitted to said first securing means to retain said elongated member against movement away from said mullion wall means;
   means for securing said elongated member at one end thereof to said cabinet adjacent one of said spaced walls;
   an outwardly exposed elongated strip of magnetically attractable material on said mullion rail, the transverse extent of said strip being less than that of said insulating elongated member and said strip being spaced inwardly from the lateral side edges of the insulating elongated member whereby said strip is insulated from said compartments; and
   means for securing said elongated strip at one end thereto to said cabinet adjacent the other of said spaced walls.

2. The refrigeration apparatus of claim 1 wherein said strip is retained to the insulating elongated member along the length thereof.

3. The refrigeration apparatus of claim 1 wherein said second securing means of the insulating elongated member is snap-fitted to said first securing means on the edge portion of the mullion wall means.

4. The refrigeration apparatus of claim 1 wherein said insulating elongated member defines an outer channel, said strip being received in said channel.

5. The refrigeration apparatus of claim 1 wherein said strip is longitudinally slidably mounted to said insulating elongated member.

6. In a refrigeration apparatus having a cabinet defining an internal space and including opposite spaced walls and mullion wall means extending between said spaced walls for dividing said space into compartments, said mullion wall means defining an outer edge portion, an improved mullion rail assembly comprising:
   an elongated member formed of a thermal insulating material overlying said edge portion to define an insulating outer mullion rail;
   an outwardly exposed elongated thin strip of magnetically attractable material, the transverse extent of said strip being a major portion of the transverse extent of the elongated member but less than that of said elongated member;
   means for retaining said strip to said insulating elongated member to be longitudinally displaceable thereon, said strip being spaced inwardly from the lateral side edges of the insulating elongated member whereby said strip is insulated from said compartments; and securing means for securing said elongated member to one of said spaced walls and securing said strip to the other of said spaced walls.

7. The refrigeration apparatus of claim 6 wherein said strip defines a midportion and connection portions extending parallel to said midportion and disposing said strip edges rearwardly of said midportion.

8. The refrigeration apparatus of claim 6 wherein said strip defines a midportion and connection portions extending parallel to said midportion and disposing said strip edges rearwardly of said midportion, with said midportion of the strip and said lateral side edges of the insulating elongated member being substantially flush.

9. The refrigeration apparatus of claim 6 wherein said strip defines a midportion and connection portions extending parallel to said midportion and disposing said strip edges rearwardly of said midportion, said insulating elongated member further defining a support portion centered inwardly of said midportion of the strip for supporting said midportion against inward deformation.

10. The refrigeration apparatus of claim 6 wherein said means for retaining the side edges of the strip to the side edges of the insulating elongated member comprises coplanar channels in said side edges of the insulating elongated member slidably receiving said side edges of the strip.

11. In a refrigeration apparatus having a cabinet defining an internal space and including opposite spaced walls and mullion wall means extending between said spaced walls for dividing said space into compartments, said mullion wall means defining an outer edge portion, an improved mullion rail assembly comprising:
an elongated member formed of a thermal insulating material;
means for securing said elongated member to one of said spaced walls against longitudinal displacement and in overlying relationship to said edge portion to define an insulating outer mullion rail;
an outwardly exposed elongated strip of magnetically attractable material on said mullion rail, the transverse extent of said strip being less than that of said insulating elongated member and said strip being spaced inwardly from the lateral side edges of the insulating elongated member whereby said strip is insulated from said compartments, said strip further defining an end connecting means; and
means for securing said strip end connecting means to said cabinet adjacent the other of said spaced walls against longitudinal displacement.

12. The refrigeration apparatus of claim 11 wherein said spaced walls are spaced vertically and said strip end connecting means is secured to said cabinet adjacent the uppermost wall.

13. The refrigeration apparatus of claim 11 wherein said spaced walls are spaced vertically and said strip end connecting means comprises an end flange extending horizontally and secured to said cabinet adjacent the uppermost wall.

14. The refrigeration apparatus of claim 11 wherein said means for securing said elongated member comprises flange means for securing one end of the elongated member to said cabinet adjacent said one wall.

15. In a refrigeration apparatus having a cabinet defining an internal space and including opposite spaced walls and mullion wall means extending between said spaced walls for dividing said space into compartments, said mullion wall means defining an outer edge portion, an improved mullion rail assembly comprising:
an elongated member formed of a thermal insulating material;
means for retaining said elongated member in overlying relationship to said edge portion to define an insulating outer mullion rail;
an outwardly exposed elongated strip of magnetically attractable material on said mullion rail, the transverse extent of said strip being less than that of said insulating elongated member and said strip being spaced inwardly from the lateral side edges of the insulating elongated member whereby said strip is insulated from said compartments, said strip further defining a turned end flange; and
means for securing said strip end flange to said cabinet adjacent one of said spaced walls, said means for securing said elongated member comprising means for securing one end of the elongated member to said cabinet adjacent the other of said walls.

16. In a refrigeration apparatus having a cabinet defining an internal space and including opposite spaced walls and mullion wall means extending between said spaced walls for dividing said space into compartments, said mullion wall means defining an outer edge portion, an improved mullion rail assembly comprising:
an elongated member formed of a thermal insulating material;
means for snap-fitting said elongated member to said mullion wall means outer edge portion to define an insulating outer mullion rail forming a longitudinal channel;
an outwardly exposed elongated strip of magnetically attractable material longitudinally adjustably carried on said mullion rail outer edge portion in said channel, the transverse extent of said strip being less than that of said insulating elongated member and said strip being spaced inwardly from the lateral side edges of the insulating elongated member;
heating means disposed between said elongated member and said strip for heating said strip to prevent condensation collection thereon, the spacing of said heated strip from said side edges of the insulating elongated member effectively preventing heat transfer from said strip to said compartments; and
securing means for securing said elongated member to one of said spaced walls and securing said strip to the other of said spaced walls.

17. The refrigeration apparatus of claim 16 wherein said means for fitting said elongated member to said mullion wall means outer edge portion comprises snap-fitting cooperating shoulders.

18. The refrigeration apparatus of claim 16 wherein said strip is carried by said elongated member in spaced relationship to said mullion wall means outer edge portion.

19. The refrigeration apparatus of claim 16 wherein said securing means comprises a flange on one end of said elongated member for securing said elongated member at said one end thereof to said cabinet adjacent one of said spaced walls, and a flange on one end of said elongated strip for securing said elongated strip at said one end thereof to said cabinet adjacent the other of said spaced walls.

20. The refrigeration apparatus of claim 16 wherein said heater wires are disposed intermediate said lateral side edges of the insulating elongated member.

21. In a refrigeration apparatus having a cabinet defining an internal space and including opposite spaced walls and mullion wall means extending between said spaced walls for dividing said space into compartments, said mullion wall means defining an outer edge portion, an improved mullion rail assembly comprising:

an elongated member formed of a thermal insulating material;

means for fitting said elongated member to said mullion wall means outer edge portion to define an insulating outer mullion rail;

an outwardly exposed elongated strip of magnetically attractable material carried on said mullion rail outer edge portion, the transverse extent of said strip being less than that of said insulating elongated member and said strip being spaced inwardly from the lateral side edges of the insulating elongated member;

heating means disposed between said elongated member and said strip for heating said strip to prevent condensation collection thereon, the spacing of said heated strip from said side edges of the insulating elongated member effectively preventing heat transfer from said strip to said compartments; and an insulative block extending between the outer edge portion of the mullion wall means and the insulating elongated member, said elongated member being secured to the mullion wall means at opposite sides of said insulative block.

* * * * *